(No Model.) 7 Sheets—Sheet 2.

W. MAIN.
ELECTRIC MOTOR OR DYNAMO ELECTRIC MACHINE.

No. 332,668. Patented Dec. 15, 1885.

WITNESSES:
E. B. Bolton
Geo. H. Fraser

INVENTOR:
William Main
By his Attorneys,
Burke, Fraser & Connell (No Model.) 7 Sheets—Sheet 3.

W. MAIN.
ELECTRIC MOTOR OR DYNAMO ELECTRIC MACHINE.

No. 332,668. Patented Dec. 15, 1885.

WITNESSES:
E. B. Bolton
Geo. H. Fraser.

INVENTOR:
William Main
By his Attorneys,
Burke & van Somitt (No Model.) 7 Sheets—Sheet 4.

W. MAIN.
ELECTRIC MOTOR OR DYNAMO ELECTRIC MACHINE.

No. 332,668. Patented Dec. 15, 1885.

WITNESSES:
E. B. Bolton
Geo. H. Fraser.

INVENTOR:
William Main
By his Attorneys,
Burke Fraser Hammett (No Model.) 7 Sheets—Sheet 5.

W. MAIN.

ELECTRIC MOTOR OR DYNAMO ELECTRIC MACHINE.

No. 332,668. Patented Dec. 15, 1885.

WITNESSES:
E. B. Bolton
Geo. H. Fraser.

INVENTOR:
William Main
By his Attorneys,
Burke Fraser Konnuts (No Model.) 7 Sheets—Sheet 6.

W. MAIN.
ELECTRIC MOTOR OR DYNAMO ELECTRIC MACHINE.

No. 332,668. Patented Dec. 15, 1885.

WITNESSES:
E. B. Bolton
Geo. H. Fraser.

INVENTOR:
William Main
By his Attorneys,
Burke Fraser Kennett (No Model.) 7 Sheets—Sheet 7.

W. MAIN.
ELECTRIC MOTOR OR DYNAMO ELECTRIC MACHINE.

No. 332,668. Patented Dec. 15, 1885.

WITNESSES:
E.B.Bolton
Geo. H. Frazer.

INVENTOR:
William Main
By his Attorneys,
Burke Fraser Bennett

UNITED STATES PATENT OFFICE.

WILLIAM MAIN, OF BROOKLYN, NEW YORK.

ELECTRIC MOTOR OR DYNAMO-ELECTRIC MACHINE.

SPECIFICATION forming part of Letters Patent No. 332,668, dated December 15, 1885.

Application filed March 2, 1885. Serial No. 157,433. (No model.)

*To all whom it may concern:*

Be it known that I, WILLIAM MAIN, a citizen of the United States, and a resident of Brooklyn, in the county of Kings and State of New York, have invented certain new and useful Improvements in Electromotors or Dynamo-Electric Machines, of which the following is a specification.

This invention relates to dynamo-electric machines, and particularly to such machines as are designed for use as motors, to be driven by an electric current for the electric transmission of power.

It is a well-known fact that every dynamo-electric machine will run as a motor, but the best dynamo is not therefore the best motor. In order to secure the most advantageous results as an electromotor the machine should be designed and proportioned especially to that end.

Electromotors as heretofore constructed have been of two classes. The first class comprises those in which motion is caused by the reaction of a field of force on a system of armature-wires carrying a current. Motors with armatures of the Siemen's and Gramme type belong to this class, their armature-coils being filled with laminated iron. The second class comprises those motors the motion of which depends mainly or entirely on the mutual attraction of masses of magnetized iron. The Griscom and Cleveland motors belong to this class. The reaction of the field of force on moving wire takes place in a subordinate degree, or even, in some machines, partially in opposition to the attraction of the iron.

Motors of the first class have the advantages of, first, taking a nearly-uniform current during all parts of the revolution; second, having no dead-points, as the coils are so numerous that one or more is always at or near the point of maximum action; third, keeping the field of force as nearly constant as possible; and, fourth, having the iron armature-core greatly subdivided to facilitate the running around of polarity, with at the same time a minimum of internal current. On the other hand, they are subject to the disadvantages of, first, complication, the numerous coils upon the armature necessitating numerous commutator-sections and connections thereto along the shaft; second, liability of short-circuiting, the insulation of so many connections being difficult to maintain; third, excessive heating of the complex mass of wire and plates forming the armature; and, fourth, expense, a small motor of this type being disproportionately costly.

Motors of the second class have the advantages of, first, simplicity; second, relative cheapness; and, third, greater power in proportion to their weight, since a greater amount of force can be exerted with a given weight of material where attraction and relative motion take place between magnetized masses of iron than where the iron is used to maintain a magnetic field and wire is driven across this field by the reaction of the currents traversing it. All small motors heretofore practically successful have been of this type, as it is found that they will do more work than those of the first class. Motors of the second class are, however, subject to the following disadvantages: first, they involve heavy magnetic pulsations succeeding each other with great rapidity; second, when of large size, the large masses of iron do not change polarity quickly enough, causing more or less loss through the retardation of the residual magnetism; and, third, in large machines particularly, internal (Foucault) currents are generated, which, with the rapid reverse of polarity, occasion great heating. Further, in some of the machines of this class the coils of wire cut the lines of force partially in the wrong direction, thus causing retardation and heating.

The object of my present invention is to produce an electromotor which shall possess as many of the advantages above stated as possible, while being at the same time subject to the minimum of disadvantages.

My improved motor belongs to the second class as above classified, in that its action is dependent upon the attraction of magnetized masses of iron, and not upon the reaction of moving coils of wire. It differs, however, (in the preferred form,) from the motors of the second class heretofore made, in that the armature or revolving member of the magnet carries no wire with it, being, however, an electro and not a permanent magnet. It also differs from them in that there is no reversal of current in the exciting-coils, and consequently no current is consumed in forcing a reversal of polarity to overcome residual magnetism and effect a repulsion of the mutually-receding masses of iron.

My new motor introduces also a novel feature of construction—namely, the arrangement of a revolving iron core within a stationary coil of wire, by which it is excited, and, further, the same coil is utilized to excite both the revolving armature and the stationary magnet. The most important and essential characteristic of my invention, however, is found in the relations of the armature, the exciting-coil, and the "stationary magnet," so called, the latter being, essentially, a part of the armature, changing its polarity in accordance with the changes of polarity in the armature, and serving as the stationary reactive portion from which the armature derives its motion, both being alike excited by the coil. The stationary magnet is not a field-magnet, since it has no continuous excitation.

Figures 1 to 13 of the accompanying drawings show the preferred form of my improved electromotor, involving all the features of my invention. Fig. 13 is a diagram of the commutator. The remaining figures illustrate modifications, and will be described hereinafter.

Figure 1:
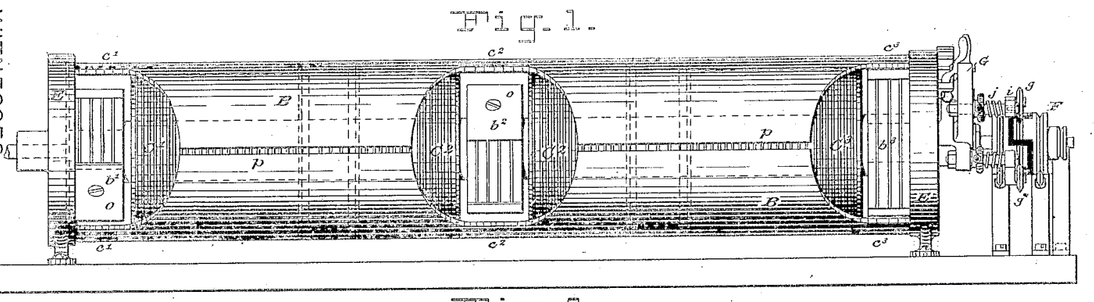
Fig. 1 is a side elevation of the machine.
Figure 2:
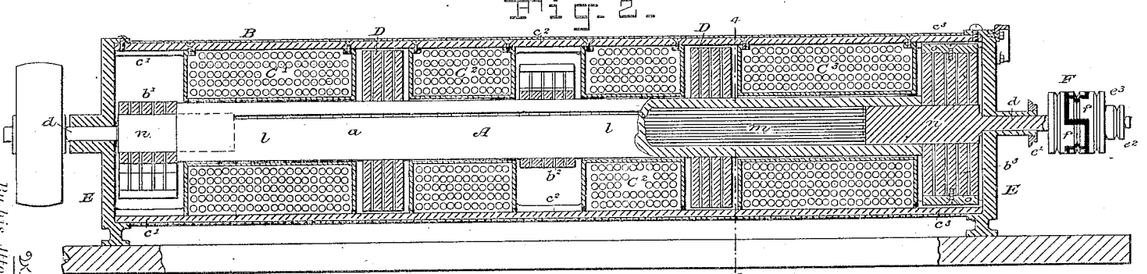
Fig. 2 is a vertical longitudinal mid-section thereof.
Figure 3:
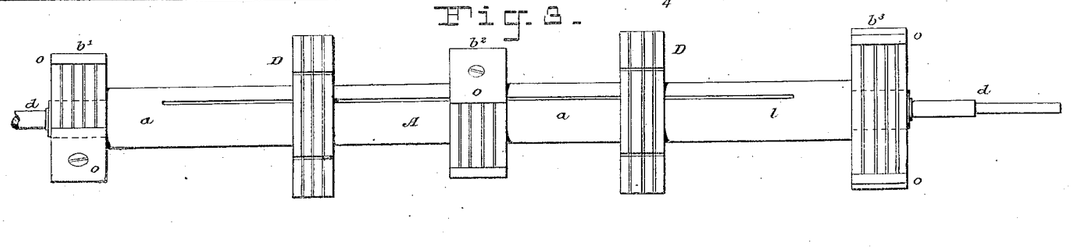
Fig. 3 is an elevation of the revolving armature removed.
Figures 4, 5, 6, 7, 8, 9:
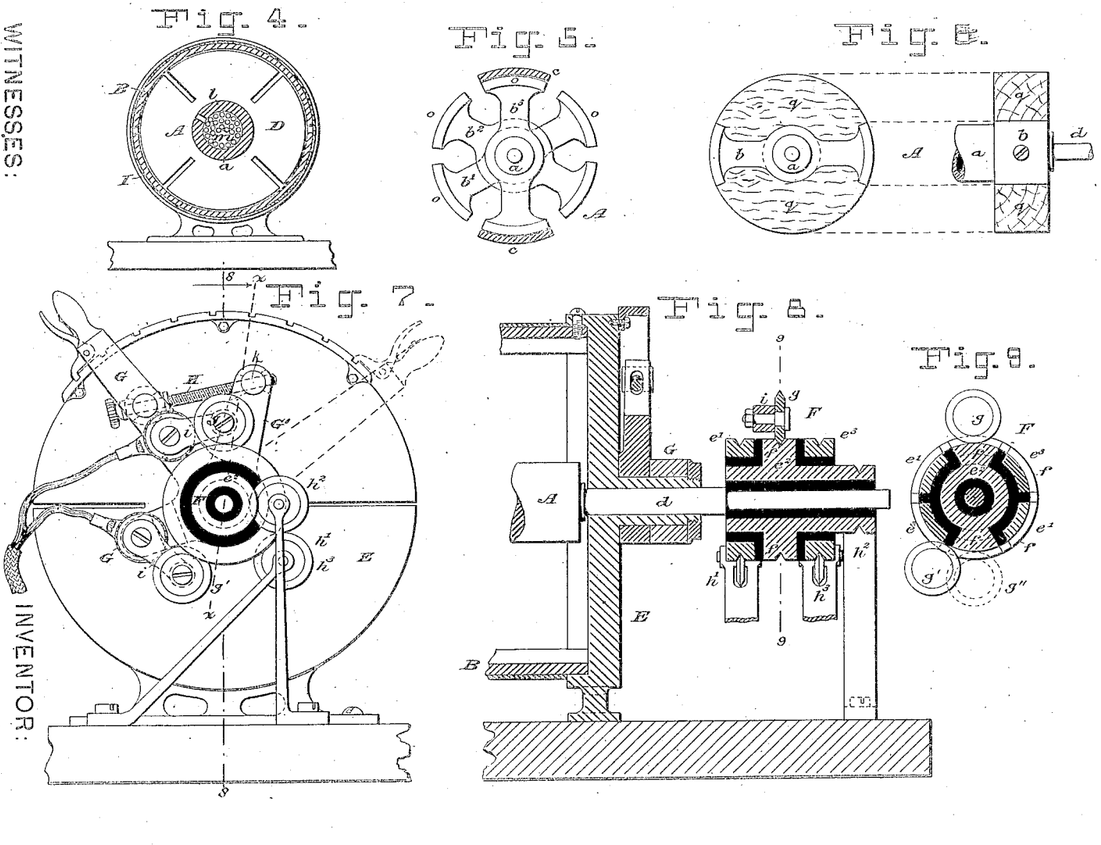
Fig. 4 is a transverse section cut on line 4 4 in Fig. 2.
Fig. 5 is an end elevation of Fig. 3, showing the arrangement of the armature pole-pieces.
Fig. 6 is a side and end view of one of the armature pole-pieces.
Fig. 7 is an enlarged end elevation of the machine, showing the commutator and reversing gear.
Fig. 8 is a vertical longitudinal mid-section of the end portion of the machine.
Fig. 9 is a transverse section of the commutator.
Figure 10:
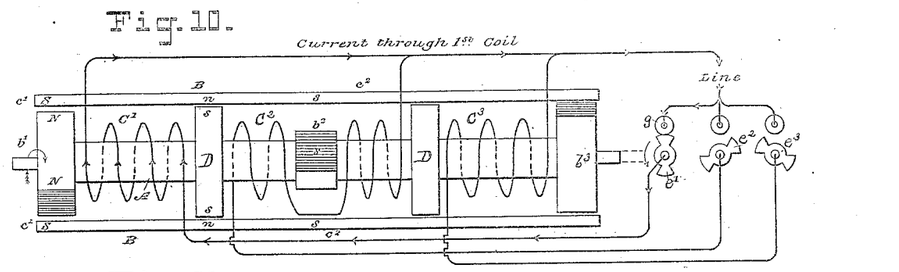
Figs. 10, 11, and 12 are three diagrams showing the circuit-connections and the magnetic changes that take place during the operation of the machine.
Figure 11:
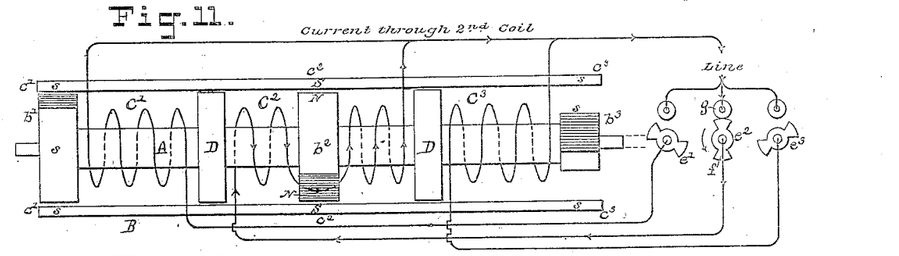
Figure 12:
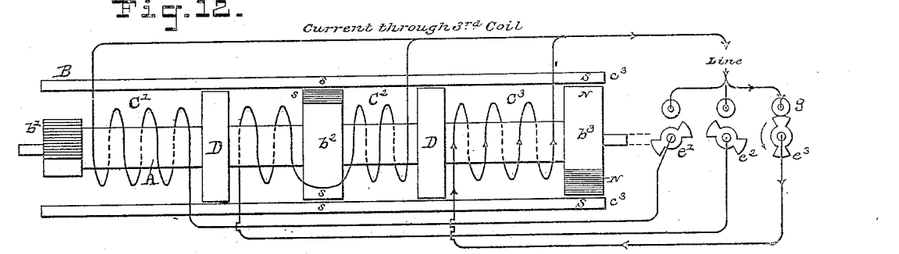

Referring chiefly to Figs. 1, 2, and 3, let A designate the revolving armature; B, the stationary magnet or reactive armature, and C C the exciting-coils. The armature A is made entirely of soft iron, and consists of a core, $a$, and three pairs of polar projections or pole-pieces, $b$, (lettered, respectively, $b'$, $b^2$, and $b^3$,) arranged at its opposite ends and at its middle. It also is provided with two soft-iron disks, D D, fixed on the core between the respective pole-pieces. The pole-pieces $b$ are each two-armed, and are relatively arranged with their diametrical axes successively sixty degrees apart, as shown in Fig. 5, which is an end elevation of the armature with the disks D omitted. The armature-core has journals $d\ d$ formed at its opposite ends. The stationary magnet B, which takes the place of the usual field-magnet, is in the form of a cylindrical tube of soft iron, cut away at its middle and both ends to form fixed poles or pole portions $c'\ c^2\ c^3$, which correspond in position to the armature pole-pieces $b'\ b^2\ b^3$, as shown in Figs. 1 and 2, with this difference, however, that the pole portions $c\ c$ are all in line with each other, those of each of the three pairs occupying the positions shown at $c\ c$ in Fig. 5. The coils C C are stationary, being fixed within the tubular magnet B and inclosing the core $a$, and by preference filling the entire space between them, leaving only a clearance around the core to permit of its free rotation. The coils are three in number, distinguished as C', C², and C³, corresponding in position to the armature pole-pieces $b'$, $b^2$, and $b^3$. The coils C' and C³ are arranged at opposite ends, the intermediate coil, C², being divided into two parts or bobbins, arranged on opposite sides of the pole-piece $b^2$. The preferred winding of these coils is as shown in Figs. 10, 11, and 12, being such that if currents were flowing through all three simultaneously they would magnetize the armature in such manner as to generate like poles (as N) in the three pole-pieces $b'\ b^2\ b^3$, and the opposite like poles (as S) in the pole portions $c'\ c^2\ c^3$ of the stationary magnet B. Each coil C acts to magnetize not only the free armature-core within it, but also the fixed magnet B surrounding it, and both are magnetized with their adjacent poles $b\ c$ of opposite polarity, so that they mutually attract each other. The iron disks D are of such diameter that they nearly fill the bore of the tubular magnet B, leaving clearance to permit of their free rotation with the armature. The disks afford a magnetic connection between the armature-core and the magnet B, serving in this respect the same purpose as the back yoke of a common horseshoe electro-magnet. At each end of the magnet B is a fixed supporting-frame, E, of brass, by preference, to which the end pole portions, $c'\ c^3$, are fastened, and which forms the bearings for the journals $d\ d$ on the armature. One of these journals, $d$, is prolonged, and carries the commutator F. (Shown best in Figs. 8 and 9.) This commutator is made up of three interlocking members, $e$, (lettered, respectively, $e'$, $e^2$, and $e^3$, corresponding with the three coils C', C², and C³,) each insulated from the journal $d$ and from both the others, and the three formed with projections $f\ f$, which interlock and are presented in triple succession in the same circumferential plane. The middle member, $e^2$, has a tubular hub and two opposite radial arms, $f\ f$. The end members, $e'$ and $e^3$, are each tubular segments with lateral arms $f\ f$, as shown in Fig. 2. There are thus six projections, $f\ f$, or three to each half-revolution. A wheel or roller, $g$, which is equivalent to a commutator-brush, rolls against the commutator, touching the projections $f\ f$, and it is through this roller that the current from the line enters the commutator, passing successively into the members $e'$, $e^2$, and $e^3$ thereof, and being carried thence to the respective coils C', C², and C³. The current is taken off from the commutator members by rollers $h'$, $h^2$, and $h^3$, by preference arranged as shown in Figs. 1, 7, and 8, and mounted on spring-arms, by which they are pressed into firm contact with the commutator.

The machine has now been sufficiently described to enable its operation to be understood.

In Figs. 10, 11, and 12 the roller $g$ is shown in triplicate, and the three commutator members $e'$, $e^2$, and $e^3$ are shown separated. As the commutator turns the current is directed into the first coil, $C'$, during the first sixth of a revolution, then into the second coil, $C^2$, during the second sixth, and into the third coil, $C^3$, during the third sixth, the same order being repeated during the remaining half-revolution.

Fig. 10 shows the machine during the first sixth of a revolution, the current from the line flowing through roller $g$, commutator member $e'$, and coil $C'$ to the line. The current flows through coil $C'$ in such direction, as shown, as to magnetize the armature A with a north polarity at its pole-piece $b'$, and the magnet B with a south polarity at each of its pole portions $c'$ $c'$. The disk D becomes incidentally of south polarity $s$, and the magnet B adjacent to it becomes of north polarity $n$. In effect the portion of the armature-core inclosed by this coil $C'$ and the portion of the magnet B surrounding it constitute (through the action of the connecting-disk D) substantially a single horseshoe-magnet, of which the core forms one leg and the tubular magnet the other leg. The armature A is set with its pole-pieces $b$ $b$ in such relation to the commutator that while the current is flowing through the coil $C'$ the pole-piece $b'$ is approaching the fixed poles $c'$ $c'$. The portions of the armature A and magnet B adjacent to the two remaining coils are feebly magnetized by induction from the excited portions, and both exhibit south polarities at or near the pole-piece $b^2$. As this pole-piece is then receding from the poles $c^2$ $c^2$, the feeble repulsion thus resulting is utilized, its effect being to overcome any back-pull because of residual magnetism that might otherwise exist. As soon as the pole-piece $b'$ reaches alignment with the poles $c'$ $c'$ the commutator diverts the current into the second coil, $C^2$, as shown in Fig. 11. The two opposing bobbins of this coil act to force a north pole in the center of the armature in the pole-piece $b^2$ between them, and a south pole in the middle fixed poles, $c^2$ $c^2$. By secondary induction both the ends of the armature and magnet become feeble south poles, as denoted at $s$ $s$, thus overcoming residual attraction. The pole-piece $b^2$ is thus attracted to the poles $c^2$ $c^2$ until when it is in alignment with them the commutator diverts the current into the third coil, $C^3$, as shown in Fig. 12. The pole-piece $b^3$ then becomes a north pole, and the fixed poles $c^3$ $c^3$ become south poles, thus attracting each other, while feeble like poles, $s$ $s$, are induced in the remote portions of the armature and magnet, and tend to repel each other. This continues until the pole-piece $b^3$ is in alignment with the poles $c^3$ $c^3$, when, a half-revolution having taken place, the current is again directed through the first coil and the operation is repeated.

I provide means for readily controlling the machine. (Shown best in Figs. 1, 7, 8, and 9.) The roller $g$ is borne by a hand-lever, G, which is fulcrumed on a boss on the end frame, E, concentric with the armature-bearing. The roller is mounted on a crank-arm, $i$, which is pivoted on a stud fixed to the lever G, and around the stud is a spiral spring, $j$, Fig. 1, which acts to press the roller $g$ into firm contact with the commutator. When the lever G is in the position shown in full lines in Fig. 7, the motor will run in one direction, (forward,) irrespective of the direction of the current; but if the lever G be thrown over through an arc of ninety degrees, as shown in dotted lines, the motor will run in the opposite direction, (backward.) This is due to the fact that the position of the roller $g$ relatively to the fixed poles $cc$ is reversed, so that the several coils are traversed by the current in reverse order, as may be readily traced by assuming that the rollers $g$ $g$ in Figs. 10, 11, and 12 are at the right or left of the several commutator members, instead of above, as shown. On bringing the controlling-lever G to an intermediate position on the axis $x$ $x$ in Fig. 7 a further change takes place, each of the armature pole-pieces being attracted toward the fixed poles during only a twelfth, instead of a sixth, of the revolution, and on passing the fixed poles it is no longer released by the shunting of the current to another coil, but continues to be attracted, and consequently pulled back for the succeeding twelfth. Thus there is as much pull in one direction as in the other, and the machine quickly comes to a stop and will afford considerable resistance to being started. This mid-position of the lever G thus acts as a brake to stop the motor. The lever G is capable of any position intermediate of those shown, and may thus be used to control to a nicety the working of the motor. As the lever is slowly moved from left to right (in Fig. 7) the motor gradually runs slower, because of the increase of its self-retardation, until the mid-position is reached, when the motor stops, and on continuing to move the lever to the right the motor will (if not loaded) slowly start backward and increase in speed until the maximum is reached coincidently with the extreme position of the lever. The lever may even move beyond the extreme positions shown.

I have thus described the three coils as each receiving the current during one-sixth of the revolution at each impulse. It is obvious, however, that each armature pole-piece is half the time approaching and half the time receding from the fixed poles, and therefore it can be made most effective if it is caused to attract the fixed poles during nearly or quite half the time, or one-quarter of the revolution at each impulse. To admit of this and to provide a means of regulating the machine according to any special conditions under which it may be placed, I provide a second roller, $g'$, for feeding the current from the line to the commutator, and render it adjustable relatively to the roller $g$.

In Fig. 9 the roller $g$ is shown at the top, and the roller $g'$, if placed diametrically opposite, as shown in dotted lines at $g''$, would have no effect; but when this roller is carried forward or back one-twelfth of a revolution to the extreme position shown it adds a duration of one-twelfth to the one sixth duration produced by a single roller, and consequently causes each coil to receive the current during one-quarter of the revolution. It follows then that on each alternate twelfth of a revolution the current is traversing two successive coils simultaneously, the arrangement being such that these two coils at such time co-operate to drive the armature forward.

By setting the roller $g'$ to positions intermediate of the extremes shown in Fig. 9 the action of the machine may be to a certain extent regulated. To facilitate this regulation, this roller $g'$ is borne by a separate lever, $G'$, which is connected to the main lever $G$, so as to be forced to move with it by means of a screw, $H$, which is swiveled to one lever and engages an oscillating nut, $k$, on the other. This screw $H$ can be turned in either direction while the machine is running, thus varying the relation of the rollers $g g'$ until the best result is attained for the particular speed and the work being done. The roller $g'$ is mounted on the lever $G'$ in the same manner as the roller $g$ on the lever $G$.

Figure 13:
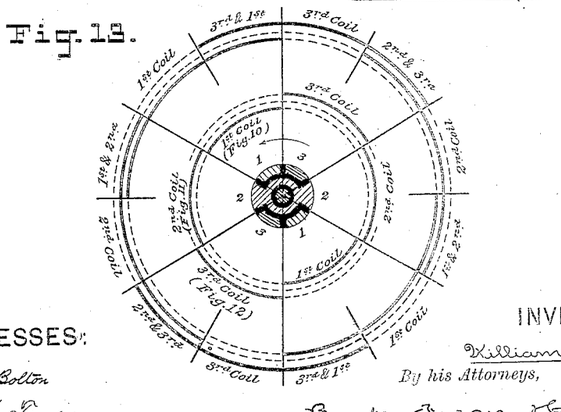

Fig. 13 shows the commutator with two diagrams surrounding it, showing the periods of the passage of the current to the coils during one revolution under two different conditions. The inner diagram shows the result when the roller $g'$ is omitted or set at $g''$ in Fig. 9. The outer diagram shows the lapping of the periods of excitement of the successive coils produced by setting the roller $g'$, as shown in full lines in Fig. 9.

My improved electromotor has the following advantages: Its construction is very simple, particularly in the moving parts. Its armature carries no wire around with it, thus avoiding much complication of winding and connections, and rendering the commutator very simple. The armature is well balanced, running with minimum friction. All the magnetized iron is wrought-iron. The tubular form of the stationary magnet inclosing the exciting-coils secures the maximum inductive effect. The exciting-coils are simple and are so arranged as to produce a double effect, magnetizing simultaneously both the armature and the stationary magnet. There is no back-pull resulting from wires cutting the field of force in the wrong direction or from residual magnetism. There is comparatively no sparking at the commutator, because the circuit is never broken, one coil being always shunted into circuit before the preceding one is cut out. The commutator is simple, consisting of only three pieces. The reversing or controlling lever $G$ effects a perfect control of the speed, direction, and effectiveness of the machine, and the regulation by means of the roller $g'$ renders the same machine adjustable to different kinds of work. These features render it especially advantageous for use on electric locomotives. There are no dead-points, the three armature pole-pieces dividing the revolution into sixths, and each commencing its pull before its predecessor becomes inert. No electro-motive force is lost by reversing the current in the coils in order to generate a repulsive force on the armature-poles, such repulsion being always very feeble, as compared with magnetic attraction under like conditions.

It will be observed that by the successive action of the three coils the changes of polarity in the armature and the stationary magnet occur like waves, traversing them from one end to the other. In the armature there is first an N pole at the left-hand end, Fig. 10, with all the rest of the armature of feeble $s$ polarity, then the N pole is transferred to the center, Fig. 11, and then it is concentrated at the right-hand end, Fig. 12. In the stationary magnet the same changes occur with reference to the S poles. Thus there is no violent reversal of polarity from a concentrated N to a concentrated S pole, such as would occur from a reversal of current in the exciting-coils, and which would entail a waste of electric energy in overcoming the molecular resistance of the iron.

I will now proceed to describe some details of construction of the motor which are very desirable, especially in large machines doing heavy work, but are not essential to the operativeness of the machine. The armature A has its core $a$ constructed of a tube, $l$, slitted longitudinally along one side, and filled with soft-iron wires $m\ m$, as shown in Figs. 1 and 4. By being thus laminated or subdivided Foucault currents around the core are reduced and its capacity for rapid change of magnetic polarity is increased. The slit does not extend to the ends of the tube, and in its ends are tightly driven iron plugs or shafts $n\ n$, the projecting ends of which receive the respective pole-pieces $b'\ b^3$ and are turned down to form the journals $d\ d$. The pole-pieces $b\ b$ are laminated, being made up of several parallel plates of soft iron, as shown, with some insulating material or non-magnetic metal—as brass—intervening, and with iron caps $o\ o$ fastened on their opposite ends. These caps form the actual pole-pieces, and preferably overhang the laminated portions, as shown.

In order to overcome the resistance of the air and prevent loss of power through the beating of the air by the pole-pieces $b\ b$, each of these pole-pieces is built out to the form of a solid disk or cylinder by inserting blocks $q$ $q$, of wood or other non-magnetic material, on each side of each of the pole-pieces, as shown in Fig. 6. These blocks are omitted in Figs. 1, 2, 3, and 5 for the sake of clearness. The disks D D are each made up of laminæ in the same manner as the pole-pieces, and they are slotted from their peripheries nearly to the core $a$ at intervals, as shown in Fig. 4, where four slots are shown. These slots act to intercept Foucault currents. The tubular magnet B is also slotted to prevent Foucault currents.

Fig. 1 shows a slot, $p$, extending its entire length in a plane midway between the pole portions $c\ c$. On the opposite side of the tube there should be another similar slot, but it need not extend entirely through the length, it being preferable to interrupt that slot opposite each disk D, leaving the tube separated by two slots between the disks, and by only one slot, $p$, at the disks. It is very desirable that an electromotor should be housed or cased in so that no dust may gain access to it, since dust, and especially metallic dust, is liable to get into the working parts and clog them. The cylindrical shape of my improved motor renders such casing-in very convenient and sightly. A sheet of brass or other suitable material, extending between the end frames, E E, is wrapped around the tubular magnet B, thus covering the slots therein and the openings between its pole portions, and effectually inclosing the working parts. This covering is shown only in Figs. 2 and 4, being lettered I in Fig. 4. The only working parts exposed are the commutator, current-rollers, and the controlling and adjusting levers, which are not affected by dust, and are the only parts liable to require attention.

My improved machine, while designed chiefly as an electromotor, is also applicable, although less effectively, for use as a dynamo-electric machine. On power being applied to rotate it, it gives out a current, due to the reaction of the residual magnetism in the tubular magnet and armature. In the small machines which I have tried this current is inconsiderable, owing to the absence of a continuously-excited field-magnet, and even in larger machines it may not prove sufficient to be practically available unless such a field-magnet be supplied. This may be done by placing a coil or coils around the stationary magnet B, as I will presently describe.

Figure 19:
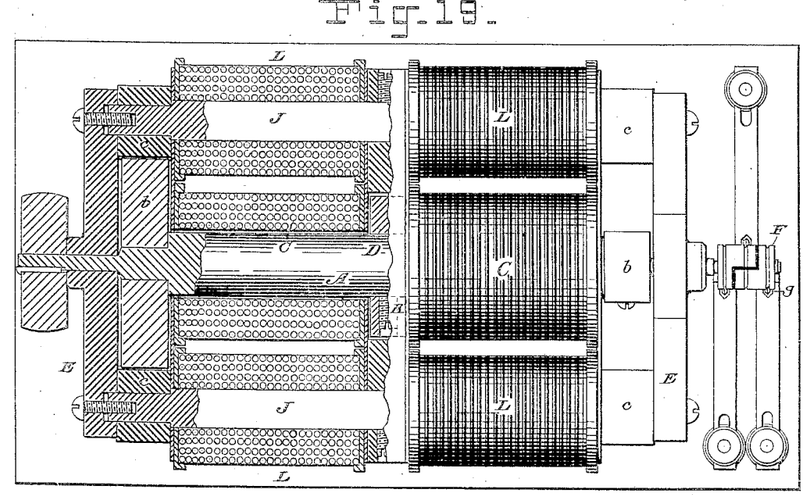
Figure 20:
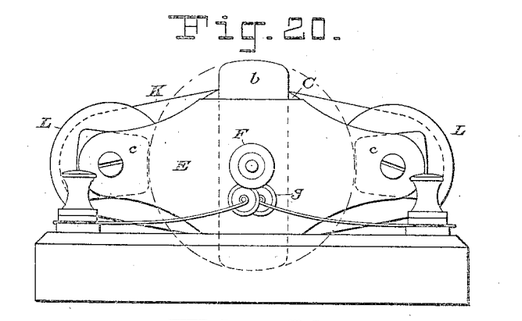
Figure 21:
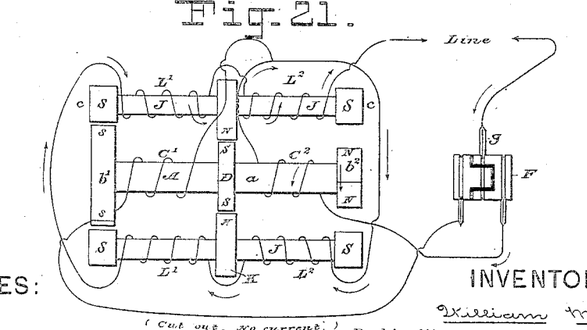
Figures 22, 24:
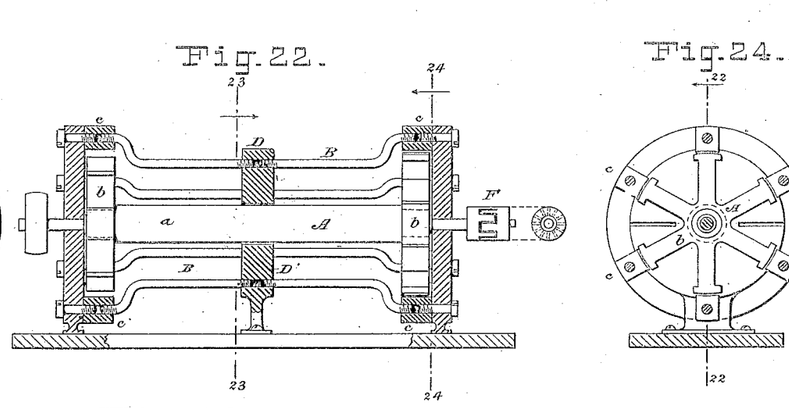
Figure 23:
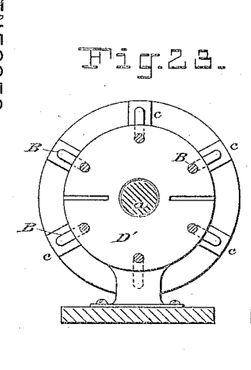
Figure 25:
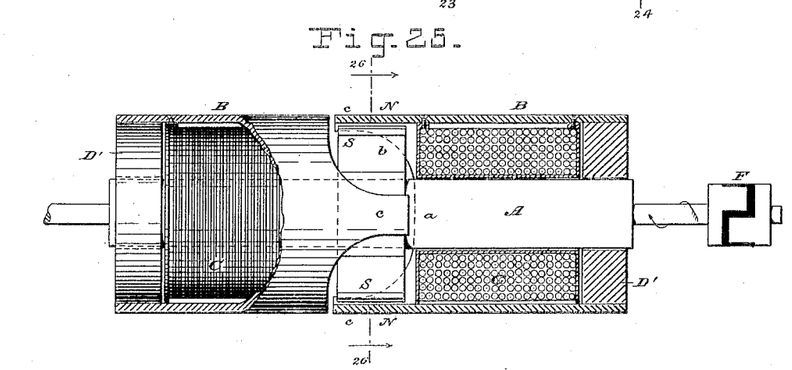
Figure 26:
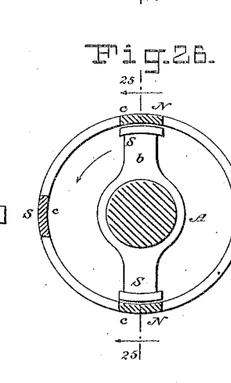
Figure 27:
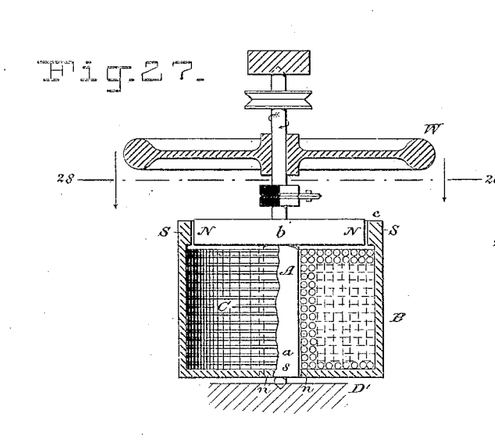
Figure 28:
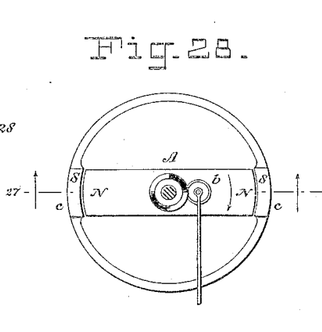
Figure 29:
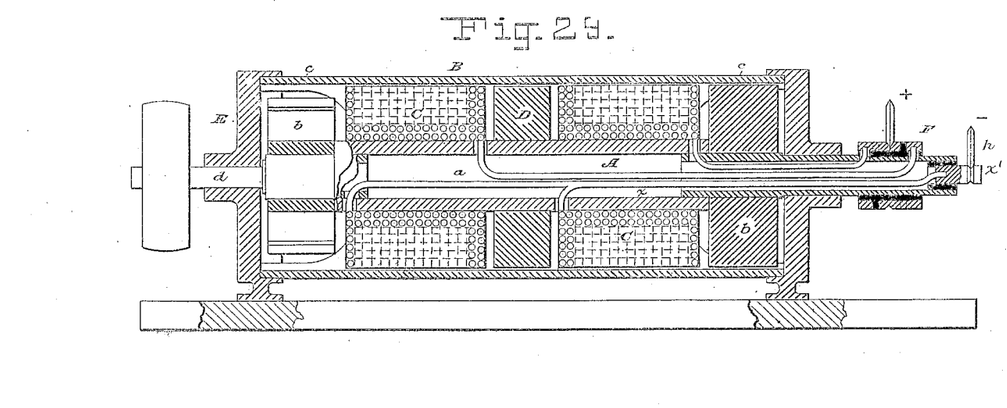

My improved machine is susceptible of considerable modification without departing from all the essentials of my invention. Instead of the pole-pieces on the armature having two arms, they may have three, four, or more arms, the poles $c\ c$ on the stationary magnet being in each case of like number. Instead of there being three coils, C C, there may be more than three, or there may be only two, or even only one, and the armature may have also more or less than three pole-pieces, $b$. The disks D are not essential, since the magnetic connection may be effected by other means, as by a non-rotative part. The magnet B need not be tubular, but may instead be made up of one, two, or more distinct bars, arranged around the coils C. The coils C, instead of being stationary, may be wound on the armature-core, and revolve with the armature, to the same electrical effect. As instances of these and other changes, I have introduced in the drawings several additional figures, showing modifications. Of these, Figs. 14 to 18 show a two-coil machine with four-armed pole-pieces. Figs. 19 to 21 show a machine wherein the stationary magnet consists of two straight bars with separate exciting-coils, to render the machine capable of acting as a dynamo. Figs. 22 to 24 show a machine wherein the stationary magnet consists of six iron bars, with six-armed pole-pieces on the armature. Figs. 25 and 26 show a two-coil machine wherein the armature has but one pole-piece. Figs. 27 and 28 show a machine having only one coil and one armature pole-piece, and Fig. 29 shows a two-coil machine wherein the coils revolve with the armature.

Figure 14:
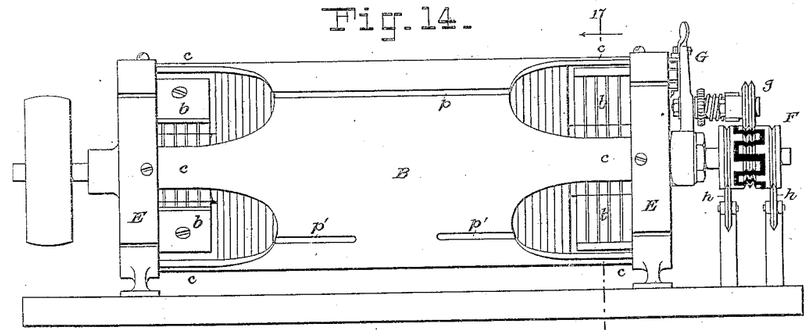
Figure 15:
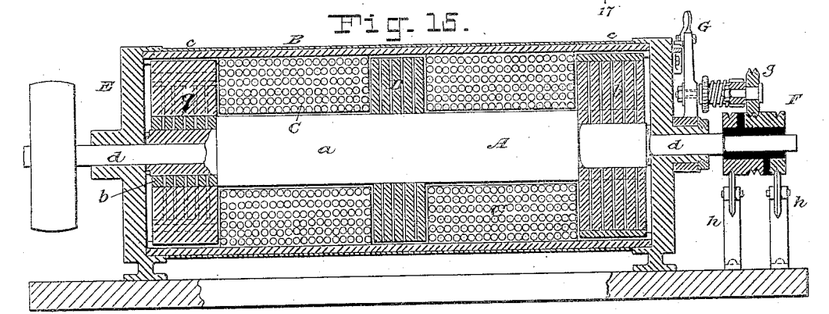
Figures 16, 17, 18:
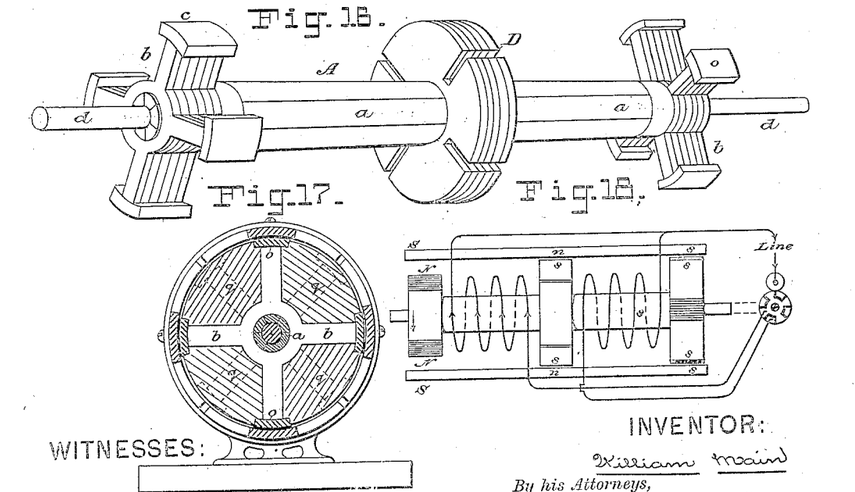

I will first describe the machine shown in Figs. 14 to 18, of which Fig. 14 is a side elevation, Fig. 15 is a vertical longitudinal mid-section, Fig. 16 is a perspective view of the armature and disk D, Fig. 17 is a transverse section on line 17 17 in Fig. 14, and Fig. 18 is a diagram showing the circuit-connections. There are two coils, C C, wound like the coils $C'\ C^3$, already described. There is a single disk, D, mounted on the armature-core $a$ between the coils. The pole-pieces $b\ b$ have each four arms and are set on the core $a$, with the arms of one midway of the arms of the other. The spaces between the arms are filled with four blocks $q\ q$. The core $a$ is built up of longitudinal segments, as shown in Figs. 16 and 17, which are built around the central shaft and are slightly separated, to suppress Foucault currents. The magnet B is tubular, with four pole-portions, $c\ c$, at each end. It is to be observed that whatever number of these pole portions is adopted, the armature pole-pieces should have a like number of arms, and either the pole portions $c\ c$ are arranged in the same longitudinal plane, as shown, and the armature pole-pieces $b\ b$ are arranged relatively in alternation, or the poles $c\ c$ will be arranged in alternation and the pole-pieces $b\ b$ in the same plane. The magnet B is slotted through its entire length at $p$, midway between two of the pole portions, and between the three remaining pole portions partial slots $p'$ are made, one of which is shown in Fig. 14. The commutator F is a two-part commutator, and the current passes into it through a single roller, $g$, carried by the reversing-lever G. Each coil C receives the current during one-quarter of the revolution, and the attraction is in alternation at opposite ends of the magnet and armature.

Fig. 19 is a plan view, partly in horizontal section, Fig. 20 an end elevation, and Fig. 21 a circuit-diagram, of a modified machine involving some of the features of my invention, which is adapted for use as a dynamo as well as for a motor. The coils C C, armature A, and disk D are substantially as in the construction last described, except that the armature pole-pieces b are two-armed. The magnet B consists of two round bars, J J, arranged on diametrically-opposite sides of the armature, and united to each other at their middles by a yoke, K, which has a circular central opening, in which rotates the disk D. On the opposite ends of these bars are fixed pole-pieces c c, and around the bars are placed coils L L, which convert these bars into veritable field-magnets, being wound, preferably, as shown, so that all four pole-pieces, c c, shall be of like polarity, the opposite pole being found in the yoke K. The coils L L are continually in circuit, while the coils C C alternate, as controlled by the commutator. In Fig. 21 the coils C are marked C' and C², and the coils L, to the right and left of the yoke, are marked, respectively, L' L². Running as a motor, the current passes from the line through the commutator to (for instance) coil C², thence successively through coils L², L', L', and L², and thence to line, and the armature-pole piece b², being of N polarity, is attracted to the S poles c c, while the remote pole-piece b', of feeble s polarity, is repelled by the S poles c c. When the commutator diverts the current through coil C' and the four coils L, the pole-piece b' is attracted and b² is repelled. Used as a dynamo, the alternate recession of the pole-pieces b b, while they are N poles, from the S poles c c induces currents alternately in the coils C' C², which currents, being both of the same name, are merely sent to line by the commutator without transposition. Used as a dynamo, my machine has the advantage of having no moving wire, no complicated windings, and a simple commutator.

The multiplex machine shown in Figs. 22 to 24 is designed especially for comparatively slow speeds. Fig. 22 is a vertical longitudinal mid-section, and Figs. 23 and 24 are vertical transverse sections, cut, respectively, in the planes denoted by the lines 23 23 and 24 24 in Fig. 22. In all the figures the exciting-coils are omitted. They are, however, the same as in Figs. 14 to 18. The pole-pieces b b of the armature are six-armed, as shown in Fig. 24. The magnet B is composed of six bars arranged longitudinally close around the outside of the coils and equidistant. Near their ends they are bent outward, bringing their pole-pieces c c farther from the center than the diameter of the coils. This is to permit of a greater divergence between the extremities of the numerous arms of the pole-pieces b b than would otherwise occur. At the middle, in place of a revolving disk, D, is a stationary disk or frame-work, D', of soft iron, having a central hole, through which the armature-core turns freely, preferably without touching it. The several magnet-bars are all secured at their middles in the outer portion of this disk D'. The commutator F is of two parts, with twelve alternations of current from one coil to the other.

Fig. 25 is a side elevation, partly in section, and Fig. 26 is a vertical transverse section, (cut on line 26 26 in Fig. 25,) of a possible modification of my invention employing two distinct magnets, B B, with their pole portions c c turned toward each other and arranged in alternation, and a single pole-piece, b, on the armature A, arranged at the middle of the core. Iron disks D' D' are placed at opposite ends, to magnetically connect the magnets B with the core a. The coils C C are excited alternately, and are so wound that whichever one is excited the pole-piece b has the same polarity, (as S,) while the poles c c of the magnet B, inclosing the particular coil excited, have the opposite polarity, (as N.) In the drawings the right-hand coil is supposed to be excited. The poles c c of the left-hand magnet B are consequently of a feeble s polarity, and act to slightly repel the S pole-piece b, while the latter is strongly attracted by the N poles c c of the right-hand magnet B.

Fig. 27 is a vertical mid-section, and Fig. 28 a plan, (in section on line 28 28 in Fig. 27,) of a small single-acting motor suitable for very light work at high speed. It is substantially one-half of the machine shown in Fig. 25. During the time that the pole-piece b is approaching the poles c c the current is flowing through the single coil C, while the pole-piece is receding. The current is interrupted by the commutator, (or, preferably, is short-circuited,) so that there is no back-pull. A fly-wheel, W, will be desirable, since the motive force is intermittent.

Fig. 29 is a vertical longitudinal mid section, answering to Fig. 15, and showing a modification wherein the coils C C revolve with the armature. The only difference between this construction and that shown in Figs. 14 to 18 is in the construction of the coils and their connections and of the commutator. The coils are wound directly upon the armature-core and fill all the space between the disk D and the pole-pieces b, but do not quite touch the outer magnet, B. The ends of the insulated wires forming the coils are carried through or along the core a, and are connected with the commutator F. The core is preferably tubular, the wires being carried through its bore. The electrical connections are essentially the same as in Fig. 18; but the commutator is necessarily somewhat different, its two parts, e' e², being connected, respectively, to the one ends of the coils C C, and the other ends thereof being connected to a common wire, x, which leads to a metal boss, x', whence the current is taken off by a wheel, h. Thus the current enters the commutator at g, and after traversing one coil or the other it emerges at h. The operation, both electrically and mechanically, is the same as in Fig. 15, except that the coils revolve instead of being stationary. This is a disadvantage, because it increases the friction and momentum and renders the coil connections more difficult.

It is one of the chief practical advantages of my invention that it enables all moving wire to be dispensed with.

In those forms of my machine having two or more coils the precise winding that I have described is not absolutely essential. I have described that which I consider preferable; but the windings may be relatively alternated or otherwise varied without departing from my invention, provided that the coils be so wound as to render the machine operative.

What I claim, and desire to secure by Letters Patent, is—

1. The combination, to form a dynamo electric machine or electromotor, of a revolving armature consisting of a core having polar projections, stationary pole-pieces arranged on opposite sides of the armature to receive the magnetic reaction of said polar projections as the latter alternately approach and recede with the rotation of the armature, and a stationary exciting-coil surrounding said core and arranged with its axis coincident with the axis of rotation of said armature, whereby the armature is caused to revolve within its exciting-coil, substantially as set forth.

2. The combination of an exciting-coil, a revolving armature consisting of a core arranged in the axis of said coil and polar projections outside thereof, stationary pole-pieces arranged on opposite sides of the armature and corresponding in position to the polar projections thereon, whereby as the armature revolves its polar projections alternately approach and recede from said pole portions, and a commutator adapted to shunt said coil into circuit while said polar projections are approaching said pole portions and cut it out of circuit while they are receding therefrom, substantially as set forth.

3. The combination of an exciting-coil, a revolving armature consisting of a core arranged in the axis of said coil and polar projections outside thereof, a stationary magnet arranged outside of said coil and within the inductive influence thereof, and having pole portions corresponding in position to the polar projections on the armature, and a commutator adapted to shunt said coil into circuit while said polar projections are approaching said pole portions and cut it out of circuit while they are receding therefrom, substantially as set forth, whereby said pole portions and polar projections mutually attract each other during the approach of the latter and cease to attract each other during the recession thereof.

4. The combination of a revolving armature, two or more exciting-coils surrounding said armature and arranged with their axes coincident with its axis of rotation, a stationary magnet arranged outside of said coils, and a commutator, substantially as set forth, adapted to cause an alternate or successive excitation of said coils.

5. The combination of a stationary magnet, B, having pole portions, a revolving armature, A, having polar projections corresponding to and alternating in arrangement with said pole portions, two or more exciting-coils, C C, surrounding said armature with their axes coincident with its axis of rotation, and a commutator, substantially as described, adapted to alternately connect each coil in the circuit and cut it out therefrom, and to direct the current alternately or successively through the respective coils, as set forth, whereby each coil receives its current in the same direction relatively to the external circuit.

6. In an electromotor, the combination of a revolving armature, two or more coils surrounding said armature with their axes coincident with its axis of rotation, and arranged to magnetize each a separate portion of said armature, and a commutator adapted to direct the current successively through said coils in the same direction, substantially as set forth, whereby each coil receives the current during not more than half the time, and during the remainder of the time it is severed from the circuit and receives no current.

7. The combination of revolving armature A, having polar projections, stationary magnet B, having corresponding pole portions, and a magnetic inductive connection between said armature and magnet, arranged remote from said polar projections and pole portions, with one or more exciting-coils, C, inclosing said armature, substantially as set forth.

8. The combination of stationary magnet B, revolving armature A, coils C C, and iron disk D, mounted on said armature and revolving therewith, with its periphery in inductive proximity to the magnet B, substantially as set forth.

9. In an electromotor, the combination of a revolving armature having polar projections, a stationary magnet having corresponding pole portions, exciting-coils inclosing said armature with their axes coincident with its axis of rotation, and the commutator F, constructed, substantially as set forth, with the roller or conductor g, through which the current enters the commutator, and a controlling-lever, G, carrying the conductor g and adapted to move the same to different positions around the commutator, and thereby to stop, start, or reverse the motor, as set forth.

10. The combination of a stationary tubular magnet, B, cut away to form pole portions c c, revolving armature A, arranged concentrically within it, and exciting-coil C, inclosing the core of said armature and inclosed within said tubular magnet, whereby it magnetizes simultaneously said armature and magnet, substantially as set forth.

11. The combination of a stationary tubular magnet, B, cut away to form pole portions c c and divided longitudinally between the pole portions, as described, with a revolving armature, A, arranged concentrically within it, and the exciting-coil C, inclosing the core of said armature and inclosed within said tubular magnet, whereby it magnetizes simultaneously said armature and magnet, substantially as set forth.

12. In an electromotor, the combination, with stationary magnet B, having pole portions and exciting-coil C, of revolving armature A, arranged in the axis of said coil and consisting of an iron core, a, subdivided into distinct longitudinal members, for the avoidance of Foucault currents, and pole-pieces b b, made up of separated laminæ, substantially as set forth.

13. In an electromotor, the combination, with stationary magnet B, having pole portions and exciting-coil C, of revolving armature A, arranged in the axis of said coil and consisting of a core, a, constructed of a longitudinally-slitted iron tube, l, and iron wires m, arranged longitudinally in said tube, and laminated pole-pieces b b, substantially as set forth.

14. The combination, with stationary magnet B, having pole portions and exciting coil C, of revolving armature A, consisting of iron core a, longitudinally subdivided, and the pole-pieces b b, each consisting of a series of iron plates separated by intervening layers of non-magnetic material and provided with pole caps o o, substantially as set forth.

15. The combination, with armature A, exciting-coils C C, and tubular magnet B, of disk-shaped end frames, E E, and non-magnetic tubular envelope or casing I, substantially as set forth, whereby the magnetic parts are inclosed and protected from dust.

16. The combination of revolving armature A, consisting of core a and three pole-pieces, b, set at equal angular distances apart, magnet B, having pole portions c c, corresponding to said pole-pieces, and three exciting-coils, C C, with a commutator, F, adapted to direct the current into said coils successively, whereby each coil receives the current during its proportionate fraction of the revolution, substantially as set forth.

17. The combination of revolving armature A, stationary magnet B, and two or more coils, C C, with a commutator, F, having as many members as there are coils and adapted to direct the current into said coils successively, with roller or conductor g, by which the current enters the commutator, and another roller or conductor, g', angularly adjustable relatively to the roller g, whereby the duration of the current through each coil may be prolonged and the current may be admitted to each coil for a longer or shorter interval before being cut off from the preceding coil, substantially as set forth.

18. The combination, with the coils C C, of the commutator F, having as many members as there are coils, the roller or conductor g, the controlling-lever G, carrying said conductor, the roller or conductor g', the lever G', carrying the latter, and the screw H, for angularly adjusting said levers G G' relatively to each other, substantially as set forth.

In witness whereof I have hereunto signed my name in the presence of two subscribing witnesses.

WM. MAIN.

Witnesses:
ARTHUR C. FRASER,
HENRY CONNETT.